United States Patent [19]

Goodman

[11] Patent Number: 5,244,958

[45] Date of Patent: Sep. 14, 1993

[54] MINERAL FILLERS

[75] Inventor: Howard Goodman, St. Austell, United Kingdom

[73] Assignee: ECC International Limited, Great Britain

[21] Appl. No.: 858,307

[22] Filed: Mar. 25, 1992

[30] Foreign Application Priority Data

Mar. 25, 1991 [EP] European Pat. Off. ......... 91302566.4

[51] Int. Cl.$^5$ .............................................. C08K 3/34
[52] U.S. Cl. .................... 524/447; 524/445; 524/446; 174/110 AR; 174/121 AR
[58] Field of Search ............... 524/446, 447, 445; 523/209, 212, 213; 106/486, 468; 501/146, 145, 147; 174/110 AR, 121 AR

[56] References Cited

U.S. PATENT DOCUMENTS

| 2,742,345 | 4/1956 | Kloepfer et al. | |
| 3,227,675 | 1/1966 | Papalos | 524/447 |
| 3,228,784 | 1/1966 | Mays et al. | 106/486 |
| 3,368,976 | 2/1968 | Conley | 524/447 |
| 4,132,700 | 1/1979 | Stephens et al. | 260/42.14 |
| 4,210,574 | 7/1980 | Stephens | 260/42.16 |
| 4,810,578 | 3/1989 | Prescott et al. | 428/405 |
| 4,866,018 | 9/1989 | Elliot | 501/145 |
| 4,927,465 | 5/1990 | Hyder et al. | 501/146 |

FOREIGN PATENT DOCUMENTS

| 0110036 | 6/1984 | European Pat. Off. . |
| 0117998 | 9/1984 | European Pat. Off. . |
| 0265223 | 4/1988 | European Pat. Off. . |
| 0267341 | 5/1988 | European Pat. Off. . |
| 0312988 | 4/1989 | European Pat. Off. . |
| 1015780 | 9/1957 | Fed. Rep. of Germany . |
| 1544666 | 4/1969 | Fed. Rep. of Germany . |
| 877074 | 9/1961 | United Kingdom . |
| 1136350 | 12/1968 | United Kingdom . |
| 1177200 | 1/1970 | United Kingdom . |
| 2025914 | 1/1980 | United Kingdom . |
| 2067535 | 7/1981 | United Kingdom . |

OTHER PUBLICATIONS

Dannenberg—*Elastomerics*, 30 to 35, 50, Dec. 1981.

*Primary Examiner*—Veronica P. Hoke
*Attorney, Agent, or Firm*—Klauber & Jackson

[57] ABSTRACT

There is provided an elastomeric composition including a kaolinitic clay mineral filler, characterised in that said kaolinitic clay mineral (a) is a hydrous kaolinitic clay mineral which has a content of non-exchangeable alkali metal cations not exceeding 10,000 ppm (parts by weight per million parts by weight of dry clay) and a content of exchangeable alkali metal cations not exceeding 750 ppm or (b) is a calcined kaolinitic clay mineral prepared by calcining a hydrous kaolinitic clay mineral having a content of non-exchangeable alkali metal cations not exceeding 10,000 ppm and a content of exchangeable alkali metal cations not exceeding 750 ppm.

11 Claims, No Drawings

MINERAL FILLERS

This invention relates to mineral fillers for incorporation into elastomeric compositions, to a filled elastomeric composition and to articles, particularly electric cable insulation, formed from such a filled elastomeric composition.

A mineral filler is generally introduced into an elastomeric composition intended for use as an electric insulating material in order to modify the natural elasticity of the elastomeric material so that the composition can be shaped accurately and consistently, for example by extrusion.

When an elastomeric composition is to be used to insulate a high-voltage electric cable it is important that the dissipation factor (or tangent of the loss angle, $\delta$, by which the phase difference between applied voltage and resulting current deviates from 90°) should be as low as possible. The dielectric loss $W_d$ in watts per meter from an insulated electric cable is given by the expression:

$$W_d \alpha 2\pi f\, CV^2 \tan \delta$$

where
f is the frequency of the A.C. in Hz;
C is the capacitance of the cable in farads per meter; and
V is the rated potential difference in volts between the conductor and earth.

Since the power loss is proportional to the square of the voltage, it is especially important at high voltages to keep the capacitance and the dissipation factor as low as possible.

In accordance with the invention, it has been found that the characteristics of electric cable insulation formed from an elastomeric composition containing a filler can be improved by using as the filler a kaolinitic clay which has a relatively low content of alkali metal ions. In particular, electric cable insulation incorporating such a filler has a surprisingly low dissipation factor.

Alkali metal cations may occur in a kaolinitic clay in two ways. They may be present in the crystal lattice of impurities which are associated with the kaolinitic clay. In this respect, kaolinitic clay almost always occurs in nature in association with mica, feldspar and quartz which originate from the granite matrix in which the kaolinite was formed by weathering. Both mica and feldspar contain appreciable quantities of alkali metal cations, principally potassium ions (and occasionally lithium and sodium ions) and these are generally not exchangeable or soluble in water, but are fixed relatively firmly in the crystal lattice of these impurity minerals. These impurities are very difficult to separate completely from the kaolinite and they are therefore generally present in the kaolinitic filler for end use.

Sodium ions are generally introduced into a kaolinitic clay during the processes by which the clay is beneficiated. Very rarely, potassium ions may be introduced into the clay mineral during beneficiation. Dispersing agents are generally used, and these are commonly sodium salts of polyphosphoric acids or sodium salts of homopolymers or copolymers of acrylic acid or methacrylic acid. Alkalis such as sodium hydroxide or sodium carbonate are also commonly used to correct the pH of an aqueous suspension in which the clay is treated. It may also be necessary to treat the clay with a reducing bleaching agent in order to remove staining of the clay by ferric iron compounds, and the reducing bleaching agent is often a sodium compound such as sodium dithionite or sodium bisulphite. Sodium ions, and occasionally potassium ions, which are introduced during beneficiation in these ways are generally present in an exchangeable form. "Exchangeable" cations are cations which may be removed into solution in water or may be exchanged by means of a cation exchange reaction. "Non-exchangeable" cations are those which cannot be removed into solution in water or exchanged by means of a cation exchange reaction.

The content of monovalent cations, and particularly the content of sodium ions present in a kaolinitic clay product depends also on the process by which the clay has been dewatered during its beneficiation. In some processes for producing kaolinitic clay the raw kaolinitic clay is beneficiated in suspension in water, and a large part of the water is subsequently removed by filtration and the filter cake thus formed is subjected to thermal drying to give a substantially dry product. With the water removed in the filtration step, a large proportion of the exchangeable monovalent cations is also removed, with the result that the content of exchangeable monovalent cations in the final product is generally not high. However, some kaolinitic clays which are beneficiated in suspension in water are dewatered by injecting the aqueous suspension directly in to a spray dryer, with the result that the monovalent cations remain in association with the kaolinitic clay.

In accordance with a first aspect of the present invention, there is provided an elastomeric composition including a kaolinitic clay mineral filler, characterised in that said kaolinitic clay mineral (a) is a hydrous kaolinitic clay mineral which has a content of non-exchangeable alkali metal cations not exceeding 10,000 ppm (parts by weight per million parts by weight of dry clay) and a content of exchangeable alkali metal cations not exceeding 750 ppm or (b) is a calcined kaolinitic clay mineral prepared by calcining a hydrous kaolinitic clay mineral having a content of non-exchangeable alkali metal cations not exceeding 10,000 ppm and a content of exchangeable alkali metal cations not exceeding 750 ppm.

In the hydrous kaolinitic clay mineral, the content of non-exchangeable alkali metal cations preferably does not exceed 7,500 ppm and the content of exchangeable alkali metal cations does not exceed 500 ppm. The content of non-exchangeable alkali metal cations may be measured by an X-ray fluorescence technique).

Typically, in the present invention, the predominant non-exchangeable alkali metal cation present in the hydrous kaolinitic clay filler will be potassium, whilst the predominant exchangeable alkali metal cation will be sodium.

The hydrous kaolinitic clay mineral for use in the first aspect of this invention may be prepared by initially selecting a suitable clay which naturally, or after beneficiation to remove impurities containing non-exchangeable alkali metal cations, such as mica and feldspar, has a content of non-exchangeable alkali metal cations below the desired level and, secondly, treating the clay, either during beneficiation or in a separate step if necessary, such that the resultant treated clay has an exchangeable alkali metal cations content not exceeding 750 ppm. The clay mineral may then be calcined.

The hydrous kaolinitic clay mineral may be treated to reduce the number of alkali metal cations (normally sodium ions) which may, for instance, have accumulated during beneficiation, by subjecting an aqueous suspension of the beneficiated clay to mechanical filtration whereby the exchangeable alkali metal cations are removed in solution. Alternatively, or in addition, a large proportion of the exchangeable alkali metal cations present in a kaolinitic clay for use in the invention may be removed by treating the kaolinitic clay mineral to a cation exchange operation whereby monovalent exchangeable cations in the clay are removed and replaced by multivalent cations (i.e. cations having a valency of two or more).

Cation exchange reactions on clays are known per se and are normally conducted by placing the clay in a solution of an electrolyte containing the relevant cation (Y) which is to be exchanged with exchangeable cations (X) in the clay:

$$X-\text{clay} + Y^+ \rightleftharpoons Y-\text{clay} + X^+$$

This reaction proceeds to equilibrium, the extent of which depends upon the nature of the ions X and Y, their relative concentrations, the nature of the clay and on any secondary reactions. In the present invention, the multivalent cation employed is more strongly adsorbed by the clay than the exchangeable alkali metal cations of the clay (which, as has already been stated, will normally be sodium cations) and this means that the equilibrium position of the exchange reaction lies well to the right hand side. Examples of suitable multivalent cations are the alkaline earth metal cations ($Mg^{2+}$, $Ca^{2+}$, $Sr^{2+}$ and $Ba^{2+}$) as well as other multivalent metal cations such as $Al^{3+}$. Other multivalent cations which should be considered as within the scope of this invention are $Fe^{3+}$ $Cr^{3+}$, $Ti^{4+}$, $Zn^{2+}$ and $Pb^{2+}$. Thus, in a cation exchange process to be employed in the present invention, the kaolinitic clay to be treated is contacted in aqueous suspension with an electrolyte containing a multivalent metal cation, the cation preferably being chosen from one of those referred to above. It is within the scope of the invention to contact the clay in aqueous suspension with two or more electrolytes so that two or more different cations are present in solution. The solution should of course be free from salts having monovalent cations. The aqueous solution containing an electrolyte may be formed by dissolving in water a water-soluble salt having a multivalent cation. Good results may be achieved by employing preferably at least 0.1% and preferably no more than 5% by weight, based on the weight of dry clay, of the water-soluble salt.

As a result of the treatment of the kaolinitic clay (either by washing or a cation exchange operation) the amount of exchangeable alkali metal cations as a proportion of the total exchangeable alkali metal cations in the clay mineral decreases significantly, although the actual magnitude of change can vary considerably between different clays having different characteristics and different initial concentrations of exchangeable alkali metal cations. For the purposes of the present invention, it is necessary that the exchangeable alkali metal cation content should be reduced to 750 ppm or less.

The kaolinitic clay is hydrous before treatment since any calcination would render the cations unexchangeable. After treatment, the kaolinitic clay is preferably calcined to a calcined kaolinitic clay (or metakaolin), at a temperature, for example, of at least 500° C. for a time which, according to the method used for calcination, may range from a fraction of a second to 10 hours. The temperature and duration of calcination should not be such that the calcined kaolinitic clay undergoes further reactions to form a significant proportion of crystalline compounds; as such, the temperature of calcination should not normally exceed about 1250° C.

The particle size distribution of the starting kaolinitic clay is not presently believed to be important.

The kaolinitic clay for incorporation in the elastomeric composition, whether in a calcined or uncalcined state, may advantageously be surface treated with at least 0.05% by weight, and preferably at least 0.25% by weight, but generally not more than 5% by weight, based on the weight of dry treated kaolinitic clay, of a substituted silane having the general formula:

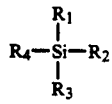

where
$R_1$ is an aminoalkyl group, a mercaptoalkyl group or an alkenyl group, for example vinyl or allyl, or an alkyl group having from 1 to 20 carbon atoms;
$R_2$ is a hydroxy group, a halogen atom, a hydroxyalkyl group or an alkoxy group; and
$R_3$ and $R_4$ (which may be the same or different) are each hydrogen, halogen atom, an alkyl group, a hydroxyalkyl group or an alkoxy group.

In radicals $R_2$, $R_3$ and $R_4$ the alkyl, hydroxyalkyl and alkoxy groups preferably have from 1 to 4 carbon atoms. Halogen is defined as fluorine, chlorine, bromine or iodine.

The treated kaolinitic clay may, alternatively (or in addition), be surface treated with a similar quantity to that of the silane with:

(a) a silazane of the general formula

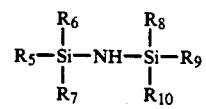

in which
$R_5$ and $R_9$ (which may be the same or different) are each an alkenyl group, for example vinyl or allyl, or an alkyl group having from 1 to 4 carbon atoms; and
$R_6$, $R_7$, $R_8$ and $R_{10}$ (which may be the same or different) are each hydrogen or an alkyl group having from 1 to 4 carbon atoms; or (b) a polysiloxane of general formula

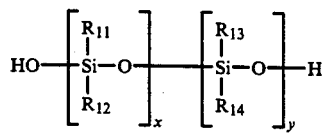

where
$R_{13}$ is hydrogen, an alkyl group having from 1 to 4 carbon atoms or an alkenyl group, e.g. vinyl or allyl and $R_{11}$, $R_{12}$, and $R_{14}$ (which may be the same or different) are each hydrogen or an alkyl group having from 1 to 4 atoms;
y is from 1 to 50% of (x+y);
and x+y is from 2 to 200; or c) an organically substituted zirconate, titanate or zircoaluminate.

The kaolinitic clay may be combined directly with an elastomer in, for instance, a particulate or granular form. Other conventional adjuvants may be introduced directly into the mix of clay and elastomer or, alternatively, may be introduced as a component of granules of the elastomer. The composition, including the mineral filler, may be formed into articles by, for example, moulding or extruding. Thus, the composition may be extruded to form a length of an electrically insulating layer on an electric cable.

The elastomer may be natural rubber or a synthetic rubber such as a homopolymer or a copolymer of ethylene and/or propylene, or a thermoplastic elastomer; the specific elastomer to be used in the present invention will depend on the requirements of the final product.

The kaolinitic clay may be, for example, a kaolin clay or alternatively a ball clay having at least 60% by weight kaolinite content.

According to a second aspect of the present invention, there is provided a process for preparing an elastomeric composition incorporating a kaolinitic clay mineral filler, which process comprises:

providing a kaolinitic clay mineral which (a) is a hydrous kaolinitic clay mineral which has a content of non-exchangeable alkali metal cations not exceeding 10,000 ppm (parts by weight per million parts by weight of dry clay) and a content of exchangeable alkali metal cations not exceeding 750 or (b) is a calcined kaolinitic clay mineral prepared by calcining a hydrous kaolinitic clay mineral having a content of non-exchangeable alkali metal cations not exceeding 10,000 ppm and a content of exchangeable alkali metal cations not exceeding 750 ppm; and combining the kaolinitic clay mineral with an elastomeric material to form a resultant elastomeric composition.

In accordance with a third aspect of the present invention, there is provided a particulate kaolinitic clay filler which (a) is a hydrous kaolinitic clay mineral which has a content of non-exchangeable alkali metal cations not exceeding 10,000 ppm (parts by weight per million parts by weight of dry clay) and a content of exchangeable alkali metal cations not exceeding 750 ppm or (b) is a calcined kaolinitic clay mineral prepared by calcining a hydrous kaolinitic clay mineral which has a content of non-exchangeable alkali metal cations not exceeding 10,000 ppm and a content of exchangeable alkali metal cations not exceeding 750 ppm; for use as a mineral filler in elastomeric cable insulation.

In accordance with a fourth aspect of the present invention, there is provided elastomeric cable insulation containing a mineral filler, characterised in that said mineral filler is a particulate kaolinitic clay filler which (a) is a hydrous kaolinitic clay mineral which has a content of non-exchangeable alkali metal cations not exceeding 10,000 ppm and a content of exchangeable alkali metal cations not exceeding 750 ppm or (b) is a calcined kaolinitic clay mineral prepared by calcining a hydrous kaolinitic clay mineral which has a content of non-exchangeable alkali metal cations not exceeding 10,000 ppm (parts by weight per million parts by weight of dry clay) and a content of exchangeable alkali metal cations not exceeding 750 ppm. The elastomeric cable insulation of this aspect of the invention should exhibit a dissipation factor (tan $\delta$) which is less than 0.003.

EXAMPLE 1

Samples of calcined kaolinitic clay were prepared by calcining the following raw kaolinitic clays:

Clay A: A kaolin clay from Devon, England having a particle size distribution such that 29% by weight consisted of particles having an equivalent spherical diameter larger than 10 $\mu$m and 41 % by weight consisted of particles having an equivalent spherical diameter smaller than 2 $\mu$m.

Clay B: A kaolin clay from Georgia, U.S.A. having a particle size distribution such that 1% by weight consisted of particles having an equivalent spherical diameter larger than 5 $\mu$m and 94% by weight consisted of particles having an equivalent spherical diameter smaller than 2 $\mu$m.

Clay C: A kaolin clay from Georgia, U.S.A. having a particle size distribution such that 4% by weight consisted of particles having an equivalent spherical diameter larger than 10 $\mu$m and 56% by weight consisted of particles having an equivalent spherical diameter smaller than 2 $\mu$m.

Clay D: A ball clay from Devon, England having a particle size distribution such that 7% by weight consisted of particles having an equivalent spherical diameter larger than 5 $\mu$m and 77 % by weight consisted of particles having an equivalent spherical diameter smaller than 2 $\mu$m.

A 200 g sample of each of the above clays was mixed with 800 ml of distilled water by means of a low shear, laboratory paddle mixer. Calcium chloride dihydrate was added as a powder in the amount of 1% by weight of the dihydrate, based on the weight of dry clay, with continued stirring. The resultant suspension was stirred continuously for 30 minutes after which it was filtered and the filter cake dried for 16 hours at 80° C. and pulverised in a pestle and mortar.

Each sample of calcium treated clay was calcined in a silica tray loaded to a depth of about 15 mm in a laboratory muffle furnace at a temperature of 1100° C. for 1 hour. After this time the trays were removed and the calcined clay allowed to cool in the air.

A sample of each clay was also analysed for sodium, calcium and magnesium cations before and after treatment with calcium chloride by the following method. A 5 g sample of each clay was weighed out into a 100 ml conical flask. 50 ml of a 1M solution of ammonium acetate was transferred by pipette into the flask and the resulting slurry shaken to disperse the clay. The flask was left to stand for 16 hours and the suspension was then filtered by means of a stainless steel pressure filtration device fitted with a 0.45 micron membrane filter. The clarified solution was analysed for sodium, calcium and magnesium content by inductively coupled plasma (ICP) spectroscopy. A sample of each clay was also analysed for non-exchangeable potassium ions by an X-ray fluorescence technique and the results were expressed in terms of parts by weight of potassium ion per million parts by weight of clay.

EPDM rubber compositions of the type suitable for electric cable insulation were prepared according to the following formulation:

| Ingredient | Parts by weight |
| --- | --- |
| EPDM | 100 |
| low density polyethylene | 5 |
| paraffin wax | 5 |

-continued

| Ingredient | Parts by weight |
|---|---|
| zinc oxide | 5 |
| 90% red lead in rubber | 6 |
| antioxidant | 1.5 |
| dicumyl peroxide | 2.6 |

In each case a master batch of the above formulation was prepared on a laboratory twin roll mill heated to 70°-80° C. 62.5 g portions of the master batch of rubber, 30 g of one of the calcined kaolinitic clay samples and 0.5 g of vinyl triethoxysilane were then mixed together on the twin roll mill heated to 70° C. The rubber composition was removed from the mill in sheet form and transferred to a preheated mould of dimensions 150 mm × 150 mm × 2 mm. The composition was placed between sheets of cellulose film and cured in a laboratory hydraulic press with steel plates at 17.2 MPa (2500 psi) and 170° C. for 20 minutes. The moulded sheet was cooled in air and its thickness measured by means of a micrometer. In each case a test piece was cut from the sheet having the shape of a major circular segment of radius 50 mm and chord length 90 mm adjacent to an isosceles triangle of base 90 mm and sides 65 mm. The test piece was aged in air for 2 days at 90° C. to drive off volatile by-products of the curing process.

The value of the dissipation factor (tan δ) was measured for each test piece by placing the test piece in a test cell between two circular aluminium electrodes which were loaded together by means of a small hydraulic press at a pressure of 0.4 MPa. The temperature in the test cell was maintained at 90° C. One electrode was connected to earth and the other electrode to a 500 volts, 50 Hz A.C. supply. The test cell was connected in one arm of a Schering Bridge manufactured by Tettex AG of Switzerland and the value of tan δ was determined directly by balancing the bridge.

The results obtained are set forth in Table I below:

TABLE I

| | Cations (ppm) | | | | |
|---|---|---|---|---|---|
| | Na$^{30}$ | Ca$^{2+}$ | Mg$^{2+}$ | K$^+$ | tam δ |
| Clay A untreated | 67 | 150 | 116 | 26,553 | 0.0083 |
| Clay A treated | 18 | 430 | 18 | 26,553 | 0.0060 |
| Clay B untreated | 1138 | 208 | 24 | 166 | 0.0042 |
| Clay B treated | 24 | 888 | 20 | 166 | 0.0020 |
| Clay C untreated | 1855 | 107 | 18 | 1328 | 0.0074 |
| Clay C treated | 414 | 1972 | 12 | 1328 | 0.0021 |
| Clay D untreated | 876 | 448 | 140 | 6638 | 0.0039 |
| Clay D treated | 214 | 1976 | 32 | 6638 | 0.0029 |

Note "ppm" means parts by weight per million parts by weight of dry clay.

EXAMPLE 2

Samples of calcined kaolinitic clay were prepared by calcining the following raw kaolinitic clays:

Clay E: A kaolin clay from Spain having a particle size distribution such that 2% by weight consisted of particles having an equivalent spherical diameter larger than 10 μm and 65% by weight consisted of particles having an equivalent spherical diameter smaller than 2 μm.

Clay F: A kaolin clay from Spain having a particle size distribution such that 0.05% by weight consisted of particles having an equivalent spherical diameter larger than 10 μm and 80% by weight consisted of particles having an equivalent spherical diameter smaller than 2 μm.

Clay G: A kaolin clay from Georgia, U.S.A. having a particle size distribution such that 0.05% by weight consisted of particles having an equivalent spherical diameter larger than 10 μm and 80% by weight consisted of particles having an equivalent spherical diameter smaller than 2 μm.

Clay H: A kaolin clay from Georgia, U.S.A. having a particle size distribution such that 0.02% by weight consisted of particles having an equivalent spherical diameter larger than 10 μm and 93% by weight consisted of particles having an equivalent spherical diameter smaller than 2 μm.

Clay E was prepared by passing the raw clay slurry through a trommel to separate coarse non-kaolinitic material and then subjecting the slurry containing solid material which consisted predominantly of kaolinitic clay to a particle size separation in hydraulic cyclones to produce a fine product having the particle size distribution already indicated. The suspension of the fine product from the hydrocyclones was then dewatered by filtration and the cake thermally dried. No reagents containing alkali metal cations were used during the preparation.

Clay F was prepared in a similar manner to Clay E except that the fine product suspension from the hydraulic cyclones had a mean particle diameter of approximately 2 μm. This suspension was then subjected to a further particle size separation step in a centrifuge to produce a suspension of a fine product having the particle size distribution already indicated. This fine product was the dewatered by filtration and the cake thermally dried. No reagents containing alkali metal cations were used during the preparation.

Clays G and H had been prepared by beneficiation in suspension in water, using dispersing agents which were sodium salts, and the clays had been dewatered by spray drying.

A sample of each of the clays was calcined in a laboratory muffle furnace at a temperature of 1100° C. for 1 hour as described in Example 1. A sample of each clay was also analysed for exchangeable sodium, calcium and magnesium ions, and for non-exchangeable potassium ions, as described in Example 1.

Filled EPDM rubber compositions containing each of the samples of calcined clay were then prepared exactly as described in Example 1, and in each case the value of the dissipation factor (tan δ) was measured.

The results obtained are set forth in Table II below:

| | | Cations | (ppm) | | |
|---|---|---|---|---|---|
| | K$^+$ | Na$^+$ | Ca$^{2+}$ | Mg$^{2+}$ | tan δ |
| Clay E (invention) | 4149 | 30 | 1160 | 136 | 0.0022 |
| Clay F (invention) | 5145 | 30 | 312 | 68 | 0.0023 |
| Clay G (comparative) | 2157 | 1060 | 135 | 26 | 0.0037 |
| Clay H (comparative) | 1328 | 820 | 168 | 24 | 0.0063 |

It can be seen from the above results that, when the EPDM rubber composition contains, as a filler, a calcined clay prepared from a kaolinitic clay which contains less than 10,000 ppm of non-exchangeable potassium ions and less than 750 ppm of exchangeable sodium ions, the dissipation factor (tan δ) is of the order of 0.002, which is an acceptable value. If, however, one or other of these requirements is not satisfied, the dissipation factor is of the order of 0.003 or above and the dielectric loss from a cable insulated with the EPDM composition would be unacceptable, especially at high voltages.

I claim:

1. Elastomeric cable insulation prepared from an elastomeric composition which comprises an elastomeric polymer and a kaolinitic clay mineral filler, characterized in that said kaolinitic clay mineral (a) is a hydrous kaolinitic clay mineral which has a content of non-exchangeable alkali metal cations not exceeding 10,000 ppm (parts by weight per million parts by weight of dry clay) and a content of exchangeable alkali metal cations not exceeding 750 ppm or (b) is a calcined kaolinitic clay mineral prepared by calcining a hydrous kaolinitic clay mineral having a content of non-exchangeable alkali metal cations not exceeding 10,000 ppm and a content of exchangeable alkali metal cations not exceeding 750 ppm.

2. An elastomeric cable insulation according to claim 1, wherein said content of non-exchangeable alkali metal cations does not exceed 7,500 ppm.

3. An elastomeric cable insulation according to claim 1, wherein said content of exchangeable alkali metal cations does not exceed 500 ppm.

4. An elastomeric cable insulation according to claim 1, wherein the kaolinitic clay is surface treated with at least 0.05% by weight based on the weight of dry treated kaolinitic clay, with:

(a) a substituted silane of the general formula

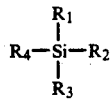

where $R_1$ is an aminoalkyl group, a mercaptoalkyl group or an alkenyl group, or an alkyl group having from 1 to 20 carbon atoms;

$R_2$ is a hydroxy group, a halogen atom, a hydroxyalkyl group or an alkoxy group; and $R_3$ and $R_4$ (which may be the same or different) are each hydrogen, halogen atom, an alkyl group, a hydroxyalkyl group or an alkoxy group;

(b) a silazane of the general formula

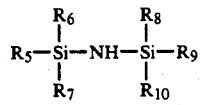

in which $R_5$ and $R_9$ (which may be the same or different) are each an alkenyl group, or an alkyl group having from 1 to 4 carbon atoms; and $R_6$, $R_7$, $R_8$ and $R_{10}$ (which may be the same or different) are each hydrogen or an alkyl group having from 1 to 4 carbon atoms; or (c) a polysiloxane of general formula

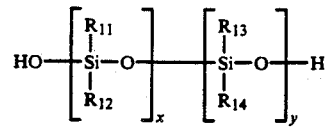

wherein $R_{13}$ is hydrogen, an alkyl group having from 1 to 4 carbon atoms or an alkenyl group, e.g. vinyl or allyl and $R_{11}$, $R_{12}$, and $R_{14}$ (which may be the same or different) are each hydrogen or an alkyl group having from 1 to 4 atoms;

y is from 1 to 50% of (x+y);

and x+y is from 2 to 200; or d) an organically substituted zirconate, titanate or zircoaluminate.

5. A process for preparing elastomeric cable insulation as claimed in claim 10, which process comprises:

providing a kaolinitic clay mineral which (a) is a hydrous kaolinitic clay mineral which has a content of non-exchangeable alkali metal cations not exceeding 10,000 ppm (parts by weight per million parts by weight of dry clay) and a content of exchangeable alkali metal cations not exceeding 750 ppm or (b) is a calcined kaolinitic clay mineral prepared by calcining a hydrous kaolinitic clay mineral having a content of non-exchangeable alkali metal cations not exceeding 10,000 ppm and a content of exchangeable alkali metal cations not exceeding 750 ppm;

combining the kaolinitic clay mineral with an elastomeric polymer to form a resultant elastomeric composition; and forming the resultant elastomeric composition into elastomeric cable insulation.

6. A process according to claim 5, wherein the kaolinitic clay mineral is prepared by (a) selecting a clay which naturally, or after beneficiation, has a content of non-exchangeable alkali metal cations below 10,000 ppm, (b) treating the clay, either during beneficiation or in a separate step if necessary, such that the resultant treated clay has an exchangeable alkali metal cations content not exceeding 750 ppm and (c) if necessary, calcining the treated kaolinitic clay mineral.

7. A process according to claim 6, wherein the kaolinitic clay is treated in step (b) by subjecting the kaolinitic clay to a cationic exchange operation whereby exchangeable alkali metal cations in the clay are removed and replaced by multivalent cations or by subjecting an aqueous suspension of the beneficiated clay to filtration whereby exchangeable alkali metal cations are removed in solution 8. A process according to claim 7, wherein the kaolinitic clay is subjected to a cationic exchange operation in which it is contacted in aqueous suspension with an electrolyte containing a multivalent metal cation.

9. Elastomeric cable insulation according to claim 1 having a dissipation factor (tan δ) of less than 0.003.

10. Elastomeric cable insulation prepared from an elastomeric composition comprising an elastomeric polymer and, as a filler, a kaolinitic clay mineral which has a content of non-exchangeable alkali metal cations not exceeding 10,000 ppm and which has been treated to reduce the number of monovalent exchangeable cations to less than 750 ppm, said cable insulation having a reduced dissipation factor when compared with the same cable insulation including as the filler the untreated kaolinitic clay mineral.

11. Elastomeric cable insulation in accordance with claim 10, wherein the kaolinitic clay mineral which has been treated to reduce the number of monovalent exchangeable cations, is subsequently calcined.

* * * * *